United States Patent [19]

Hawkins

[11] Patent Number: 4,527,009

[45] Date of Patent: Jul. 2, 1985

[54] VIBRATION DAMPER WITH MOTION LIMITING FEATURE

[75] Inventor: Ronald G. Hawkins, Massena, N.Y.

[73] Assignee: Aluminum Company of America, Pittsburgh, Pa.

[21] Appl. No.: 601,033

[22] Filed: Apr. 16, 1984

[51] Int. Cl.³ .............................................. H02G 7/14
[52] U.S. Cl. ..................................................... 174/42
[58] Field of Search ......................................... 174/42

[56] References Cited

U.S. PATENT DOCUMENTS 1,992,538  2/1935  Monroe et al. ....................... 174/42

FOREIGN PATENT DOCUMENTS 611556  3/1935  Fed. Rep. of Germany ........ 174/42
612341  4/1935  Fed. Rep. of Germany ........ 174/42

Primary Examiner—Laramie E. Askin
Attorney, Agent, or Firm—Brian D. Smith

[57] ABSTRACT

A new and improved Stockbridge type damper is disclosed. The improvement includes means for preventing the damper's weights or inertia members from excessive motion so as to minimize the possibility of damper failure.

7 Claims, 4 Drawing Figures

VIBRATION DAMPER WITH MOTION LIMITING FEATURE

BACKGROUND OF THE INVENTION

This invention relates in general to new and improved vibration dampers for protecting suspended elongate members against vibration-induced fatigue failures adjacent their points of support or suspension. The invention is more particularly addressed to an improved Stockbridge type damper which has the capability of withstanding undesirable strains resulting from ice buildup on the conductor.

It is a well-recognized and accepted fact that suspended elongate members are vibrated by wind blowing thereagainst and that aeolian vibrations produced therein are a frequent source of fatigue failures in the elongate members adjacent their points of support or suspension. In the case of stranded cables, failure by fatigue may involve fracture of all, or less than all, of the strands incorporated in their fabrication. The aeolian vibrations complained of exist almost entirely in a substantially vertical plane, are particularly critical in the range of wind velocities from 2 to 15 miles per hour, and are caused by alternate formation of eddy wind currents or vortices moving above and below the longitudinal extent of an elongate member on the leeward side thereof.

The amplitudes of individual aeolian vibrations have been determined and observed to be relatively small and normally less than the diameters of the elongate members so vibrated. In addition, it has been observed and determined that there are many loops and node points in any given length of span of a vibrating elongate member, with 100 loops in a 1000-foot span of a suspended electrical transmission line being a common occurrence.

The aeolian vibrations herein described are in contrast to the less frequently encountered and observed phenomenon of "galloping", which characterizes substantial and perceptibly large amplitudes of displacement of suspended elongate members, such as one or two loops per span, experienced with suspended electrical transmission cables and similar elongate members under wind and icing conditions.

The loop length, frequency and amplitude of aeolian vibrations vary over wide ranges of values for any given length of span, cross-sectional area of elongate member and tension within the suspended member, in accordance with the direction and velocity of the wind inducing the complained of vibrations. Manifestly, energy-absorbing devices, termed vibration dampers, have been devised and are in regular use in attachment on suspended elongate members, subject to aeolian vibration, for the express purpose of protecting the elongate members against fatigue failure adjacent their points of suspension.

One of the most effective and widely used dampers for preventing and/or minimizing aeolian vibrations in suspended elongate members is known commercially as the Stockbridge damper. This damper, as conventionally fabricated and used for about 50 years, is described and illustrated in U.S. Pat. No. 1,992,538, issued Feb. 26, 1935. In its essentials, the conventional Stockbridge damper herein referred to comprises a pair of inertia members, or weights, separated by an axially extending resilient member to the opposite ends of which one each of the inertia members is secured. A clamp secured to the resilient member, intermediate the inertia members, is adapted to attach the damper to a suspended elongate member to be protected thereby and, in operation, aeolian vibrations in the suspended elongate member are transmitted to the damper to shake or vibrate the inertia members under the energy-absorbing restraint of the resilient member supporting the same.

While the Stockbridge damper works well under normal weather conditions, under icy conditions its failure rate increases dramatically. Ice forms on the conductor to create more surface area for wind contact. As a result, wind which normally is easily handled by the damper in ice-free weather now produces aeolian vibrations in the conductor that exceed the damper's damping capacity. These vibrations cause the damper's inertia weights to pass through amplitudes that are beyond the endurance limits of the damper's resilient members, thereby resulting in resilient member fatigue failure in time. Trying to overcome this problem by employing larger dampers with greater damping capacity introduces even more trouble since such dampers in ice-free situations entrap aeolian vibrations at the damper clamp location, which thereby causes fatigue failure at this point.

SUMMARY OF THE INVENTION

The present invention minimizes the aforementioned problems caused by ice buildup on the conductor by providing a damper with means for preventing excessive inertial member movement. Such motion limiting means is preferably mounted between an inertia member and the conductor cable being damped by rigidly affixing one end of the motion limiting means to the inertia member and loosely anchoring the opposite end of the motion limiting means to the conductor, such loose anchoring being in a fashion that permits normal damping movement of the inertia member but prevents the damaging excessive movement referred to earlier.

THE DRAWINGS

The invention, along with its advantages and objectives, will be best understood from a consideration of the following detailed description along with the accompanying drawings, in which.

DETAILED DESCRIPTION OF THE INVENTION

Figure 1:
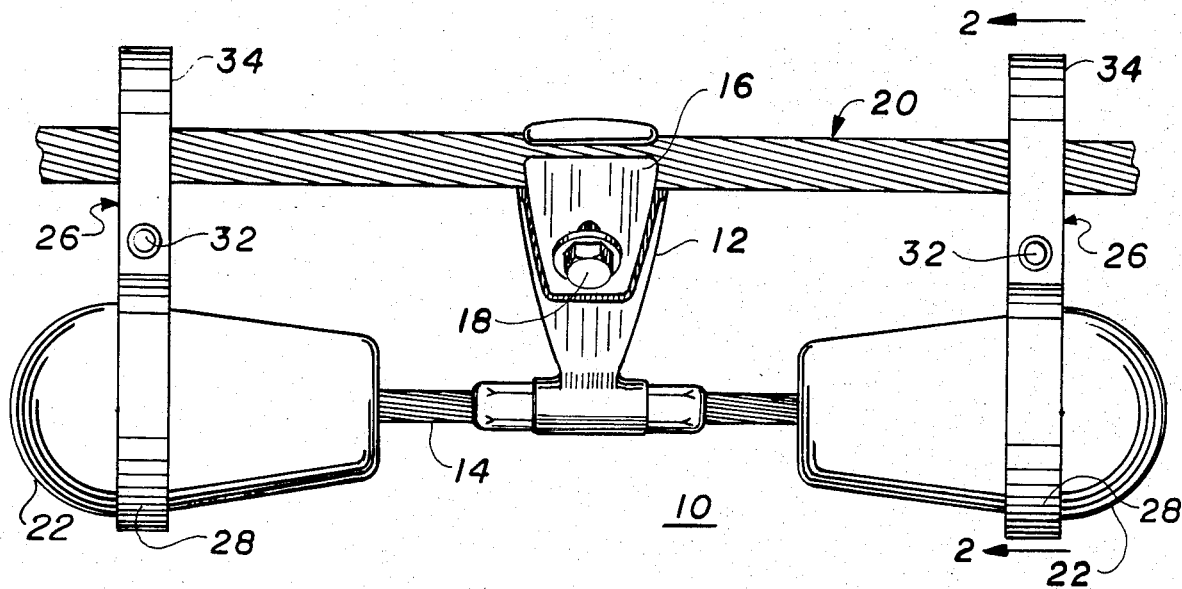
FIG. 1 is a front elevation view of a motion limiting damper of the present invention.

Referring now to FIG. 1, numeral 10 designates generally an embodiment of a conventional Stockbridge damper. Damper 10 comprises a cable-attaching clamp, designated generally as clamp 12, compressed as by swaging or otherwise engaged on a length 14 of resilient material, such as a stranded steel cable, intermediate the ends thereof. The clamp 12 is of generally hook shape remote from its engagement on the resilient member 14 and is provided with an adjustable cooperating arm or lug 16 and securing bolt 18 for clamping attachment or affixation of the damper to a suspended conductor 20, such as an overhead electrical transmission cable or conductor.

An inertia member or weight 22 is secured to each outboard end of the length 14 of the resilient member. The inertia members 22 are usually of substantially equal mass and weight, in any one size or weight of damper.

Connection and securement of an inertia member 22 on opposite ends of the resilient member 14 is preferably accomplished by employing a radially compressible and tapered sleeve or collet (not shown) in a manner well known to those skilled in the damper art, such as that described in U.S. Pat. No. 3,052,747.

Figure 2:
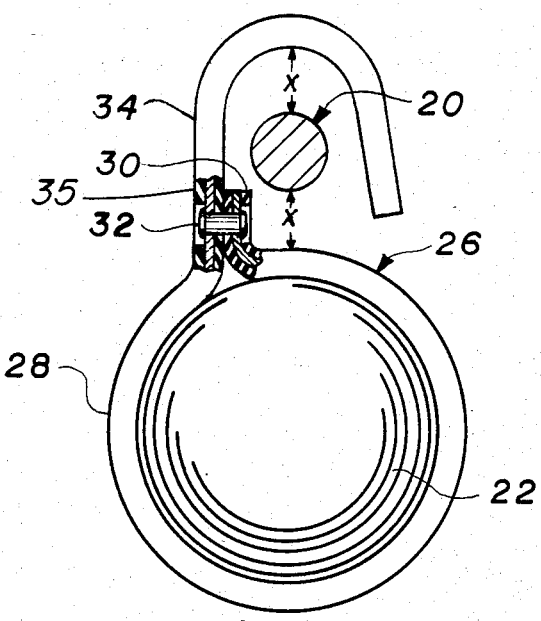
FIG. 2 is an end elevation view taken from lines 2—2 of FIG. 1 with a portion shown in section.

Preventing inertia members from excessive movement caused by conductor ice buildup, as mentioned earlier, is an important aspect of the present invention which is provided, in part, in the embodiment of FIGS. 1 and 2 by rigidly affixing a clamp 26 to inertia member 22. As depicted in FIG. 2, rigid attachment of clamp 26 to inertia member 22 is provided by a clamp preferably made of spring steel and having a bottom circular portion 28 with a predetermined configuration that encircles an axial portion of the surface of inertia member 22. Rigid attachment is attained upon riveting the end 30 of clamp 26 with a rivet 32 to a point on the clamp's midsection, such point enabling tight clamping of the clamp to the inertia member to prevent (by friction) any relative movement therebetween. The upper portion of clamp 26, referred to herein as upper portion 34, has an inverted U shape and is dimensioned to extend a predetermined distance X above and below conductor 20 when the damper is in its resting position (i.e. in the non-moving state, not subject to aeolian vibration). Distance X, which will vary with conductor size, is determined beforehand to be the maximum vertical distance the inertia member should travel from its resting position for adequate damping. Movement beyond distance X, such as that which occurs in conventional dampers, is usually caused by conductor ice buildup and, as referred to earlier, is undesirable in that it puts an unintended strain on the resilient member causing fatigue which ultimately results in the resilient member's failure.

The inverted U shape of upper portion 34 of clamp 26 permits the U's side walls (not numbered) to encircle conductor 20 and keep it in the upper portion of the clamp, thereby preventing the damper from the aforementioned damaging vertical motion.

The upper portion 34 of clamp 26 should also preferably be provided with a thin non-abrasive coating 35 of material, such as polyvinyl chloride, to minimize wear and damage to the conductor resulting from the conductor's rubbing against the upper portion of the clamp.

Figure 3:
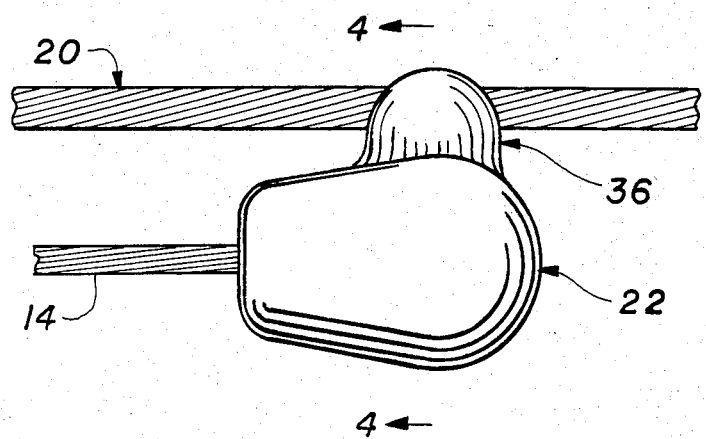
FIG. 3 is a front fragmentary elevation view of an alternative embodiment of the invention.
Figure 4:
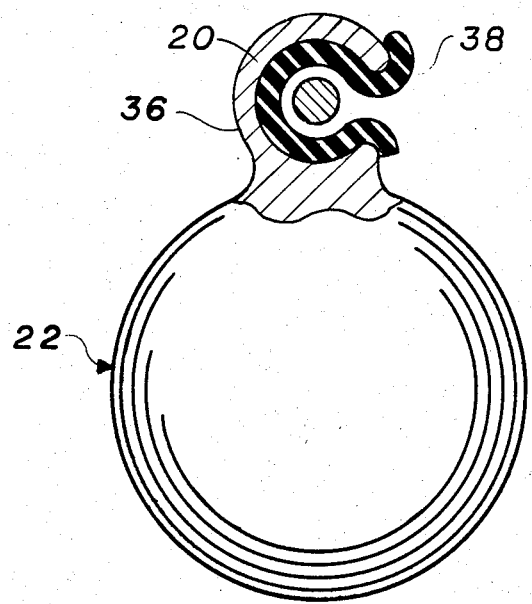
FIG. 4 is an end elevation view taken from lines 4—4 of FIG. 3 with a portion shown in section.

FIGS. 3 and 4 represent, respectively, front and transverse fragmentary elevational views of an alternative embodiment of the present invention. This embodiment is similar to that previously described except that clamp 26 of the previous embodiment is replaced by a clamp 36 which is integrally cast as part of inertia member 22. Another distinction from the previous embodiment of FIGS. 1 and 2 is that a rigid snap-in elastomer bushing 38 is provided instead of the non-abrasive coating applied to the upper portion of the clamp of the previous embodiment. Bushing 38 is able to snap into attachment with the clamp by sizing and configuring it to intimately mate with the conductor facing surface of clamp 36. Other portions of the damper depicted in FIGS. 3 and 4 are substantially similar to those of FIGS. 1 and 2, with similar elements identified by the same reference numerals.

While the invention has been described in terms of preferred embodiments, the claims appended hereto are intended to encompass all embodiments which fall within the spirit of the invention.

What is claimed is:

1. In a vibration damper comprising a pair of inertia members, one each fixedly supported at the ends of a resilient member, and provided with a clamp engaging the resilient member intermediate the inertia members for attachment of the damper to a suspended conductor subject to aeolian vibration, the improvement comprising a pair of motion limiting means, each of which includes an inverted U-shaped motion limiting clamp having one end thereof rigidly attached to an inertia member and an upper portion dimensioned to loosely anchor about a conductor such that when the damper is attached to a conductor and at rest, the upper portion of the motion limiting clamp extends a predetermined distance above and below the conductor, said predetermined distance being a distance that permits normal damping movement of the inertia member but prevents damaging excessive vertical movement.

2. A damper as recited in claim 1 wherein the inverted U-shaped clamp is made from spring steel.

3. A damper as recited in claim 1 wherein the said upper portion of the clamp is provided with a non-abrasive coating.

4. A damper as recited in claim 1 further comprising a rigid elastomer bushing sized and configured to intimately mate with the conductor facing surface of said motion limiting means such that snap-in attachment therewith results.

5. A damper as recited in claim 1 wherein the motion limiting means is integral with the inertia member.

6. A damper as recited in claim 5 wherein the integral motion limiting means and inertia member are made from cast metal.

7. A damper as recited in claim 5 further comprising a rigid elastomer bushing sized and configured to intimately mate with the conductor facing surface of said motion limiting means such that snap-in attachment therewith results.

* * * * *